United States Patent
Chen et al.

(10) Patent No.: US 9,449,227 B2
(45) Date of Patent: Sep. 20, 2016

(54) SYSTEMS AND METHODS FOR CREATING AN AERIAL IMAGE

(71) Applicant: HERE Global B.V., Veldhoven (NL)

(72) Inventors: Xin Chen, Evanston, IL (US); Roman Ostrovskiy, Prospect Heights, IL (US); Xiang Ma, Chicago, IL (US)

(73) Assignee: HERE Global B.V., Eindhoven (NL)

( * ) Notice: Subject to any disclaimer, the term of this patent is extended or adjusted under 35 U.S.C. 154(b) by 151 days.

(21) Appl. No.: 14/150,147

(22) Filed: Jan. 8, 2014

(65) Prior Publication Data
US 2015/0193963 A1    Jul. 9, 2015

(51) Int. Cl.
| G06K 9/00 | (2006.01) |
| G06T 17/05 | (2011.01) |
| G06T 19/20 | (2011.01) |
| G01S 17/89 | (2006.01) |

(52) U.S. Cl.
CPC ............ *G06K 9/0063* (2013.01); *G06T 17/05* (2013.01); *G06T 19/20* (2013.01); *G01S 17/89* (2013.01); *G06T 2210/56* (2013.01); *G06T 2219/2012* (2013.01)

(58) Field of Classification Search
CPC .................. G06F 17/30241; G06K 2209/40; G06K 9/0063; G06K 9/20; G06K 9/00208; G06K 2009/2045; G06T 17/05; G06T 2207/10032; G06T 3/4038; G06T 7/0065; G06T 7/0097; G06T 2200/32; G06T 3/0031; G06T 5/50; G01C 11/025; G01C 11/02; G01C 11/06; G03B 15/006; H04N 7/181
See application file for complete search history.

(56) References Cited

U.S. PATENT DOCUMENTS

| | | | | |
|---|---|---|---|---|
| 8,699,800 B1* | 4/2014 | Chau | ........................ | G06K 9/46 382/201 |
| 2008/0183383 A1* | 7/2008 | Asai | ........................ | G06T 17/05 701/455 |
| 2009/0110239 A1* | 4/2009 | Chen | ..................... | G06T 15/205 382/103 |
| 2009/0232355 A1* | 9/2009 | Minear | .............. | G06K 9/00201 382/103 |
| 2010/0254591 A1* | 10/2010 | Scherubl | .......... | G01N 21/95607 382/144 |
| 2011/0115812 A1* | 5/2011 | Minear | ................... | G06T 17/00 345/593 |
| 2011/0164037 A1* | 7/2011 | Yoshida | .................. | G06T 15/08 345/419 |
| 2014/0112536 A1* | 4/2014 | Ely | ........................ | G06T 7/0026 382/103 |
| 2014/0267393 A1* | 9/2014 | Mitchell | ................. | G06T 11/60 345/632 |
| 2015/0036870 A1* | 2/2015 | Mundhenk | ............ | G06T 7/0028 382/100 |

OTHER PUBLICATIONS

Alexa et al., Computing and Rendering Point Set Surfaces, Jan. 2003, IEEE TVCG.
Besk et al., A Method for Registration of 3-D Shapes, Feb. 1992, vol. 14, No. 2, IEEE Transactions on Pattern Analysis and Machine Intelligence.

(Continued)

*Primary Examiner* — Haixia Du
(74) *Attorney, Agent, or Firm* — Lempia Summerfield Katz LLC

(57) ABSTRACT

Systems/apparatuses and methods are provided for creating aerial images. A three-dimensional point cloud image is generated from an optical distancing system. Additionally, at least one two-dimensional street level image is generated from at least one camera. The three-dimensional point cloud image is colorized with the at least one two-dimensional street level image, thereby forming a colorized three-dimensional point cloud image. The colorized three-dimensional point cloud image is projected onto a two-dimensional plane, using a processor, thereby forming a synthetic aerial image.

18 Claims, 3 Drawing Sheets

(56) References Cited

OTHER PUBLICATIONS

Castillo et al., Point Cloud Segmentation via Constrained Nonlinear Least Squares Surface Normal Estimates, 2009, Recent UCLA Computational and Applied Mathematics Reports.

Chen et al., Range Image Segmentation for Modeling and Object Detection in Urban Scenes. 2007, 3-D Digital Imaging and Modeling, Sixth International Conference on. IEEE.

Elaksher et al., Reconstructing 3D Buildings from Lidar Data, 2002, International Archives of Photogrammetry Remote Sensing and Spatial Information Sciences.

Hernandez et al., Filtering of Artifacts and Pavement Segmentation from Mobile LiDAR Data, 2009, ISPRS Workshop Laserscanning, Paris, France.

Hernandez et al., Point Cloud Segmentation Towards Urban Ground Modeling, 2009, IEEE.

Johnson et al., Using Spin Images for Efficient Object Recognition in Cluttered 3D Scenes, 1999, Pattern Analysis and Machine Intelligence IEEE.

Koran et al., Strip Histogram Grid for Efficient LIDAR Segmentation from Urban Environments, Jun. 2011, Computer Vision and Pattern Recognition Workshops, Computer Society Conference on IEEE.

Moosmann et al., Segmentation of 3D Lidar Data in Non-Flat Urban Environments Using a Local Convesity Criterion, 2009, Intelligent Vehicles Symposium.

Munoz et al., Directional Associative Markov Network for 3-D Point Cloud Classification, Jun. 2008, International Symposium on 3D Processing.

Nan et al., SmartBoxes for Interactive Urban Reconstruction, 2010, ACM Transactions on Graphics.

Zheng et al., Non-Local Scan Consolidation for 3D Urban Scenes, 2010, ACM Siggraph.

Wang et al., A Hole-Filling Strategy for Reconstruction of Smooth Surfaces in Range Images, Oct. 12-15, 2003, Computer Graphics and Image Processing.

Wang et al., Lidar Data Segmentation and Classification Based on Octree Structure, 2004, Int. Archives of Photogrammetry and Remote Sensing.

Zavodny et al., Region Extraction in Large-Scale Urban Lidar Data, 2009, Computer Vision Workshops, IEEE 12th International Conference on IEEE.

U.S. Appl. No. 14/038,322, filed Sep. 26, 2013.

* cited by examiner

SYSTEMS AND METHODS FOR CREATING AN AERIAL IMAGE

FIELD

The following disclosure relates to graphics, images, and/or image data and, more particularly, to generating aerial imagery from street level imagery and Light Detection and Ranging (LIDAR) data.

BACKGROUND

Geographic mapping and modeling systems attempt to place structures in proper positions in a geographic area to accurately describe or depict the geographic area. Traditionally, determining the locations of structures is a labor intensive process of manually surveying a geographic area to determine precise locations for the boundaries of various structures. In geographic areas where there are numerous structures, such as metropolitan areas with many buildings, bridges, walls, and other structures, it may require significant resources to manually survey all structures to properly and accurately depict the geographic area. Accordingly, enhancements in producing and using graphics images, such as for navigation or geographic views, in a more efficient manner may be desired.

SUMMARY

Systems/apparatuses and methods are provided for creating aerial images. In one embodiment, the method comprises receiving a three-dimensional point cloud image generated from an optical distancing system. The method further comprises receiving at least one two-dimensional street level image generated from at least one camera. The method further comprises colorizing the three-dimensional point cloud image with the at least one two-dimensional street level image, thereby forming a colorized three-dimensional point cloud image. The method further comprises projecting, using a processor, the colorized three-dimensional point cloud image onto a two-dimensional plane, and thereby forming a synthetic aerial image. In certain embodiments, the synthetic aerial image provides an aerial view that is occluded from view by a conventional aerial or satellite camera.

In another embodiment, the apparatus comprises at least one processor and at least one memory including computer program code for one or more programs, where the at least one memory and the computer program code configured to, with the at least one processor, cause the apparatus to at least perform: (1) receive a three-dimensional point cloud image generated from an optical distancing system; (2) receive at least one two-dimensional street level image generated from at least one camera; (3) colorize the three-dimensional point cloud image with the at least one two-dimensional street level image to form a colorized three-dimensional point cloud image; and (4) project the colorized three-dimensional point cloud image onto a two-dimensional plane to form a synthetic aerial image.

BRIEF DESCRIPTION OF THE DRAWINGS

Exemplary embodiments are described herein with reference to the following drawings.

DETAILED DESCRIPTION

Figure 1:
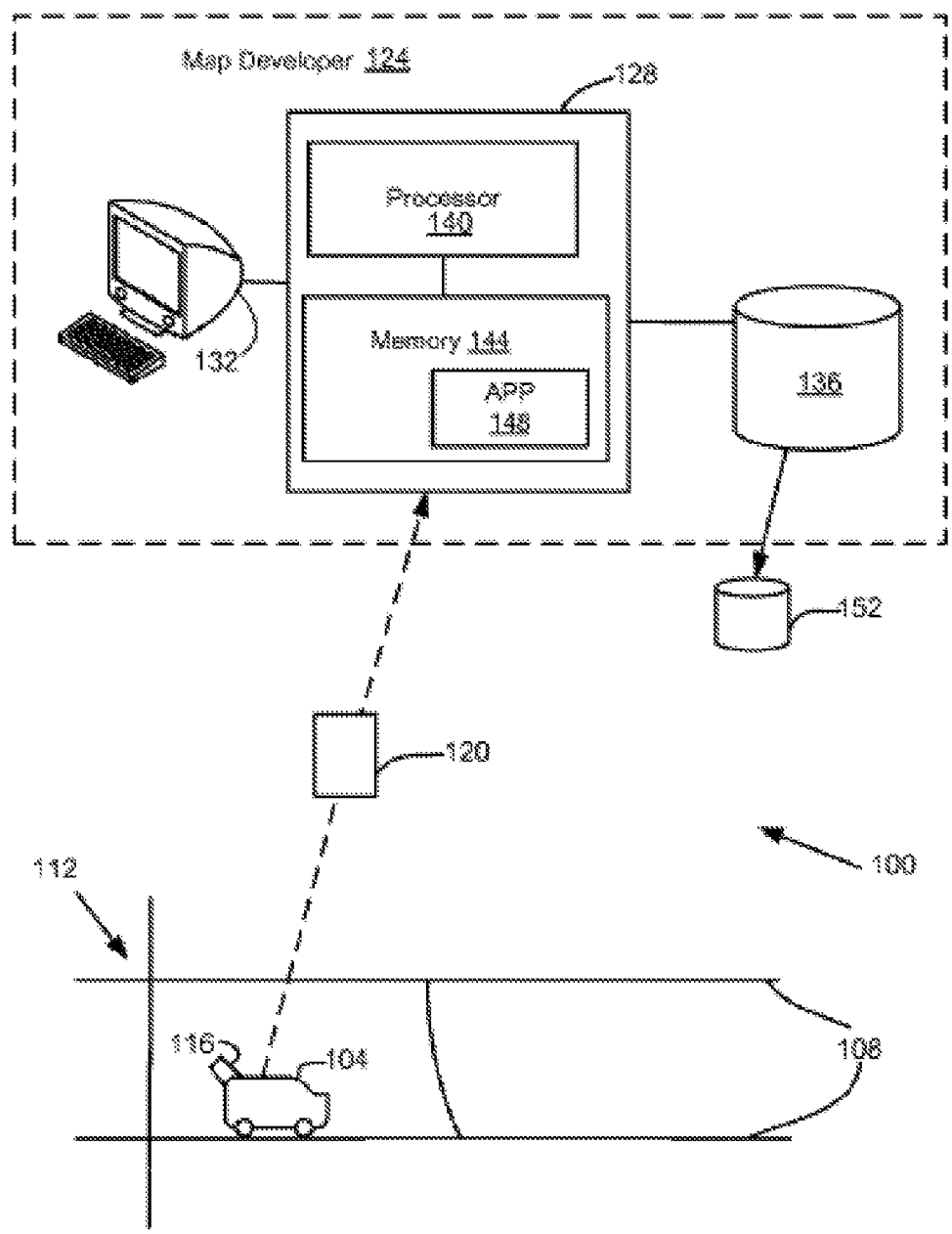
FIG. 1 is a diagram of an exemplary geographic and/or navigation data system.

Data acquisition techniques may be used to develop improved, synthetic aerial images through the collection and processing of both two dimensional (2D) street level images and three dimensional (3D) point clouds representing a geographic area and any structures included therein.

Such a synthetic aerial image may provide an improvement over conventional aerial or satellite imagery, wherein a conventional aerial image is typically captured by a camera on an airplane flying thousands of meters above the earth's surface and a conventional satellite image is typically captured by a camera on a satellite orbiting several hundred kilometers above the earth's surface. For example, through the collection of street level data, the synthetic aerial image may be able to provide an aerial image of the road where a conventional image is unavailable. This may include instances where the road is occluded from the conventional aerial collection point, based on, for example, tree canopies or dense buildings. Additionally, through the collection of street level data, a synthetic aerial image may include higher resolution that the conventional image data. Also, the synthetic aerial image may provide better global positioning system ("GPS") data alignment than a conventional aerial or satellite image. Further, the synthetic aerial image may be generated for any viewing angle, while conventional aerial or satellite viewing angles are fixed after capturing.

In certain embodiments, the synthetic aerial image is developed by: (1) collecting 3D cloud point data, (2) collecting 2D street level image data, (3) colorizing the 3D cloud point data with the 2D street level image data, and (4) projecting the colorized 3D point cloud data onto a 2D plane.

Collection of 3D Point Cloud Data

In certain embodiments, the 3D data are "depth maps" or "point cloud" data acquired using 3D optical distancing systems or intensity-based scanning techniques, such as those described in U.S. Pat. No. 8,553,942, herein incorporated by reference in its entirety. In certain embodiments, depth maps or point cloud data are collected using a Light Detection and Ranging (LIDAR) system. LIDAR, also known as LiDAR, Lidar, or other similar representations, may also be referred to as three-dimensional laser scanning or an optical distancing system, which employs one or more lasers or "cameras" to collect data points representing an area, such as an area about a road or walkway. Software generates the depth map or point cloud based on the measured distance, the locations of the optical distancing system, which may be on a moving platform such as a car, and the angle of the laser. Other optical distancing systems include a stereoscopic camera, a time of flight infrared camera, and a structured light device. A LIDAR device collects and gathers data points in a point cloud in which each data point corresponds to a local coordinate, such as (x, y, z), and is either on or off. Alternatively, the LIDAR data may be a grayscale point cloud including an intensity (indicating reflectivity) for each data point, in a predetermined range of values (e.g., 0 to 255, 0 to 65536) with black at one end of the range and white at the other. The point cloud may be stored in ASCII or LIDAR exchange format (e.g., the American Society for Photogrammetry and Remote Sensing (ASPRS) .LAS file format). The one or more lasers may be in a near infrared spectrum (such as about 700 nm to about 5000 nm or about 800 nm to about 2500 nm) or other light spectrum.

In one embodiment, a LIDAR data acquisition system may be attached or otherwise integrated with a vehicle. There may also be a positioning system integrated with the LIDAR vehicular system such as a GPS to provide a base reference for the data acquired by the LIDAR system. The mobility of a vehicular system may facilitate acquiring data across a large geographic area using established positions for reference and integration of the acquired data into a point cloud representing the geographic area.

FIG. 1 shows one embodiment of a geographic and/or navigation data system 100 useful for collecting the 3D data points. The geographic data or navigation system 100 includes, but is not limited to, an object 104 travelling on a path network 108 in a geographic region 112, a device 116, a processing device 128, a workstation or computer 132, and/or a database 136. Additional, fewer, or different components may be provided. For example, a proxy server, a name server, a map server, a cache server or cache network, a router, a switch or intelligent switch, additional computers or workstations, a user interface, administrative components, such as an administrative workstation, a gateway device, a backbone, ports, network connections, and/or network interfaces may be provided. While the components in FIG. 1 are shown as separate from one another, one or more of these components may be combined.

The object 104 is a vehicle, such as a car, truck, motorcycle, bicycle, Segway, or other transportation device or mechanical device used to move on the path network 108. Alternatively, the object 104 may represent a pedestrian, such as a human being or animal, that walks or moves along the path network 108. The path network 108 is a road network and/or a collection of other pathways. For example, the path network 108 is a road network made up of various roads. The roads may be used to drive vehicles on, such as local and neighborhood streets as well as highways. Also, instead of or in addition to traditional streets, the path network 108 may include bicycle roads or paths, walking paths, or other travel paths. Alternatively, the path network 108 may be an open area space with no specific paths or travel constraints. The path network 108 is in the geographic region 112, such as a city, a suburb, a state, a country, and/or other geographic region.

The object 104 travels along or moves about the path network 108 to collect data. A supporting device or housing 116 is attached or connected with or carried by the object 104. The supporting device 116 may be or may include equipment to collect data representing an area about or around a road or path or other area. For example, the collected data may be laser, LIDAR, imagery, and/or video/camera data (such as in the visible spectrum or other spectrum). Other data such as location data, GPS data, and/or other geographic data may be collected.

In one embodiment, the supporting device 116 is a housing or container that is attached to or carried by a pedestrian (the object 104), and as the pedestrian is on and/or moving on a path, sidewalk, or other area, equipment, such as a LIDAR device and/or camera, in the supporting device 116 collects data. In another embodiment, the supporting device 116 is a housing or container that is attached to a vehicle and, as the vehicle is on and/or moving on a road or path, equipment, such as a LIDAR device and/or camera, in the supporting device 116 collects or gathers data corresponding to the surrounding area. Alternatively, the supporting device 116 may be the LIDAR device or camera device itself or parts thereof. The supporting device 116 may be positioned at a backend of a vehicle or object and may be angled to enhance collection. In other embodiments, the supporting device 116 may be positioned any place on a vehicle, pedestrian, or object and in any direction.

The collected data is stored on one or more computer-readable media 120, such as a CD-ROM, DVD, flash drive, hard drive, or other tangible media suitable to store data. Different types of data may be stored on the same medium 120. Alternatively, separate media 120 may be used to store separate or different types of data. In one embodiment, LIDAR or laser data, photographs (such as digital or electronic photographs), video images, and/or other image data collected by the object 104 and/or the device 116 are stored in one or more media 120. Alternatively, the media 120 may be signals carrying or having data. The collected LIDAR or image data may represent areas or regions about or around a path, road, or other area. The collected laser or LIDAR data and/or images may include geographic features, such as sky features, terrain or surrounding features, roads or paths (such as sidewalks), road or path markings (such as crosswalks or lane markings), road or path signs, points-of-interest ("POIs") such as buildings, parks, museums, etc., and/or other features or objects.

The collected image data, via one or more media 120, is sent to a map, geographic, and/or navigation data developer 124, such as HERE, NAVTEQ, or Nokia Corporation. For example, a medium 120 may be mailed to or brought to the map developer 124. Alternatively, some or all of the collected data may be transmitted to the map developer 124 via a wireless and/or wired network. For example, the network may include the Internet, an intranet, a local area network ("LAN"), a wide area network ("WAN"), a virtual private network ("VPN"), a server network, a cellular network, a satellite network, a broadcasting network, a wireless or wired connection, and/or any known or future network or connection. The term "map developer" may also include third-party contractors.

The processing device 128 maintained by the map developer 124 receives the collected data. The processing device 128 is one or more servers, computers (such as a desktop tower or a laptop processing unit), processors, and/or other electronic processing systems or devices. The processing device 128 includes, but is not limited to, a processor 140, a memory 144, and an image software application 148. Additional, fewer, or different components may be provided.

The processing device 128 may include or be in communication with the workstation or computer 132. For example, the workstation 132 is a user interface, electronic console, and/or computer with one or more input devices that may be used to access, control, and/or communicate with the processing device 128 or components thereof.

The processor 140 is a general processor, application-specific integrated circuit ("ASIC"), digital signal processor, field programmable gate array ("FPGA"), digital circuit, analog circuit, or combinations thereof. In one embodiment, the processor 140 is one or more processors operable to control and/or communicate with the various electronics and logic of the processing device 128. The memory 144 is any known or future storage device. The memory 144 is a non-volatile and/or volatile memory, such as a Random Access Memory "RAM" (electronic), a Read-Only Memory "ROM" (electronic), or an Erasable Programmable Read-Only Memory (EPROM or Flash memory). A memory network may be provided. The memory 144 may be part of the processor 140. The memory 144 is operable or configured to store laser, LIDAR, and/or image data or other data.

The processor 140 or other processor is configured or adapted to execute the image software application 148, which may be stored in the memory 144 or other memory. For example, the image software application 148 generates a multi-layered image (such as a two-dimensional scalable vector graphics ("SVG") multi-layered image) based on model data, such as three-dimensional model data corresponding to a geographic area. In one embodiment, the application 148 identifies and/or receives three-dimensional model data, such as collected three-dimensional LIDAR point cloud data, and performs processes or rendering sequences, which are discussed in detail below, to generate a multi-layered graphics image of a geographic area. The generated multi-layered graphics image may be used in navigation or geographic systems as well as in a variety of user interfaces, devices, or systems. Also, the generated multi-layered graphics image may be provided to developers of such systems and/or devices for configuration purposes.

In one embodiment, one or more generated multi-layered graphics images are stored, linked, indexed, and/or associated with or in the database 136, which is in communication with the processing device 128. Alternatively, one or more generated multi-layered graphics images are stored in one or more separate or different databases that may or may not be associated with the database 136 or data thereof. In one embodiment, the geographic database 136 includes data used for navigation-related and/or geographic-related services. For example, the geographic database 136 contains road segment/link and node data records that represent a road network, such as the path network 108. A node represents an end point of a road segment and/or intersection points. The road segments and nodes may be associated with attributes, such as geographic coordinates, street names, address ranges, speed limits, turn restrictions at intersections, and other vehicle navigation attributes, as well as POIs, such as gasoline stations, hotels, restaurants, museums, stadiums, offices, automobile dealerships, auto repair shops, buildings, stores, etc. Alternatively, the geographic database 136 contains path segment/link and node data records or other data that represent pedestrian paths in addition to or instead of the vehicle road record data.

The geographic database 136 may be a master geographic database that is stored in a format that facilitates updating, maintenance, and development. For example, the master geographic database 136 or data in the master geographic database 136 is in an Oracle spatial format, such as for development or production purposes. The Oracle spatial format or development/production database may be compiled into a delivery format, such as a GDF format.

The data in the production and/or delivery formats may be compiled or further compiled to form geographic database products or databases 152, which may be used in end user navigation devices or systems or other systems or devices. For example, a customer of the map developer 124 (such as a developer of navigation devices or systems) may receive generated multi-layered graphics images as well as other geographic data in a delivery format and then compile and/or configure such data for end user devices. In one embodiment, geographic data is compiled (such as into a PSF format) to organize and/or configure the data (e.g., segment/link, node, multi-layered graphics image, and/or other data or attributes) for performing navigation-related functions and/or services such as route calculation, route guidance, map display, speed calculation, distance and travel time functions, and other functions, by a navigation device. The navigation-related functions may correspond to vehicle navigation, pedestrian navigation, or other types of navigation.

Figure 2:
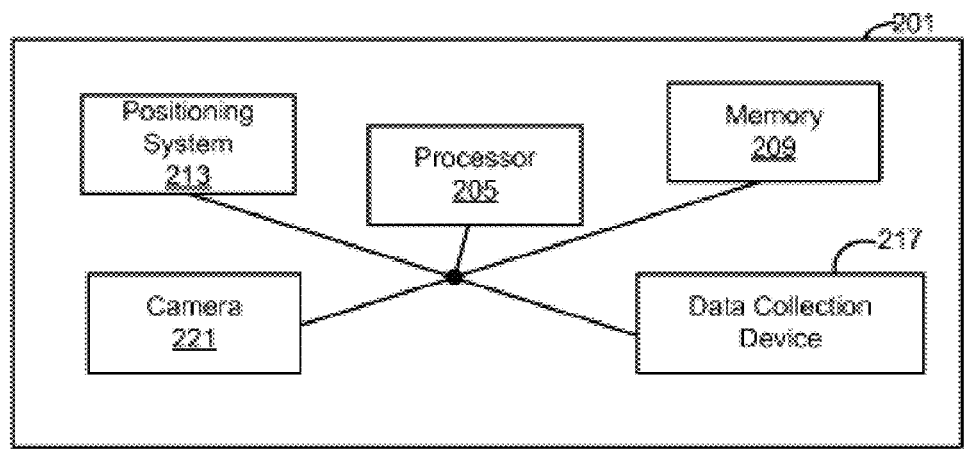
FIG. 2 illustrates an embodiment of components of a device used in the exemplary system of FIG. 1.

FIG. 2 illustrates an embodiment of components of a device 201. For example, the device 201 may be an embodiment of the object 104, such as a vehicle, or may be similar to the supporting device 116. In one embodiment, the device 201 is a support or housing that includes equipment to collect data. For example, the device 201 is removably or integrally attached or connected with a vehicle. The device 201 is positioned at a top backend of the vehicle. Alternatively, the device 201 may be positioned on or in any part of the vehicle at any angle. In another embodiment, the device 201 is attached to or carried by a pedestrian. For example, the device 201 may be a LIDAR device or other device for collecting three-dimensional data.

The device 201 includes, but is not limited to, a processor 205, a memory 209, a positioning system 213, a data collection device 217, and a camera or camera device 221. Additional, fewer, or different components may be provided. For example, an input device may be provided. The input device may be one or more buttons, keypad, keyboard, mouse, stylist pen, trackball, rocker switch, touch pad, voice recognition circuit, or other device or component for controlling or inputting data in one or more of the components of the device 201. While the components in FIG. 2 are shown as separate from one another, one or more of these components may be combined. Also, some of the components may be provided outside of the device 201. For example, if the device 201 is a housing attached to a vehicle, the positioning system 213, the processor 205, the memory 209, an input device, and/or other components may be in the vehicle or on another part of the vehicle while the data collection device 217 and the camera 221 are in the device 201. The data collection device 217 and the camera 221 may also be separated into different enclosures or supports.

The processor 205 is similar to or different than the processor 140. The processor 205 is configured to operate the collection equipment, such as the positioning system 213, the data collection device 217, and the camera system 221. For example, the processor 205 sends commands to the various collection devices to collect data and synchronizes or manages the different components. Also, the processor 205 is configured to store data from the collection devices into the memory 209. The memory 209 is similar to or different than the memory 144. The memory 209 is operable or configured to store collected light, laser, LIDAR, image, and/or position data or other data. The memory 209 may be part of the computer-readable medium 120 or may be a separate memory.

The positioning system 213 is a GPS system, one or more mechanical and/or electrical sensors, one or more gyroscopes, a local positioning system, one or more direction sensors, or other system or device for providing position data, such as location data (e.g., longitude, latitude, and/or altitude) and/or direction data, of the device 201, components thereof, or an attached object, such as a vehicle.

The camera 221 is one or more cameras used for taking pictures or videos of a surrounding area. For example, the camera system 221 includes a video camera that records video data (such as in the visible light spectrum) representing geographic features of and about a road or path as a vehicle drives along the road or path. The camera 221 may also capture still photographs separate from the video data. The camera 221 is able to capture different colors and associated text of geographic features.

The data collection device 217 may be a light data collection device. For example the device or system 217 may include a light source and a light receiver. In one embodiment, the data collection 217 is a LIDAR device or sensor, a laser device, and/or other device that collects data points, such as three-dimensional data, by transmitting and receiving light. In one embodiment, the LIDAR device is a sixty-four element LIDAR sensor HDL-64E from Velodyne, Inc, located in Morgan Hill, Calif. and/or a LMS200 series LIDAR sensor from SICK AG, located in Waldkirch, Germany. For example, one SICK LIDAR sensor (which may rotate at about 180° may provide fewer data points but with lower noise) and one sixty-four element LIDAR sensor from Velodyne (which may rotate at about 360° may provide more dense data points but with noisier data) may be used.

Collect 2D Street Level Imagery

In addition to the collection of 3D point cloud data, 2D street level images may also be captured using a street level data collection system, such as, but not limited to, the navigation data system shown in FIGS. 1 and 2, and described above. In certain embodiments, the 2D street level images are color images.

Similar to the 3D data point collection, the 2D street level images may be collected using an object 104 (e.g., vehicle or pedestrian) having a supporting device 116 such as a camera. In certain embodiments, the 2D and 3D image data are collected using the same object and/or supporting device at a similar time, or approximately the same time. In certain embodiments, the 2D and 3D image data are collected using the same object and/or supporting device from a similar vantage point (i.e., capturing the image data from a similar geographic location using the object/supporting device positioned in the same direction). In other embodiments, the 2D and 3D image data are collected using a different object and/or supporting device, and the 2D and 3D data may be collected at different times.

In certain embodiments, the 2D street level image is a panoramic image. In some embodiments, the panoramic image is a 360 degree panoramic image. In some embodiments, one or more individual 2D street level images are captured from different angles or perspectives to form the panoramic image. In one particular embodiment, at least four individual 2D street level images are captured from different angles or perspectives to form the panoramic image. In another particular embodiment, at least six individual 2D street level images are captured from different angles or perspectives to form the panoramic image.

The collected 2D image data may be stored on one or more computer-readable media 120, such as a CD-ROM, DVD, flash drive, hard drive, or other tangible media suitable to store data. In certain embodiments, the 2D and 3D data are stored on the same computer-readable media. In other embodiments, the 2D and 3D data are stored on separate media.

Like the 3D image data, the collected 2D image data may be sent to a map, geographic, and/or navigation data developer 124, such as HERE, NAVTEQ, or Nokia Corporation, for further processing.

Colorizing the Point Cloud Data Using the Street Level Imagery

In certain embodiments, the collected 3D point cloud data is further processed with the collected 2D street level image data. In certain embodiments, the 2D street level color images are used to colorize 3D point cloud images. The colorization process may involve overlaying a 3D point cloud image with a 2D image of the same scene. That is, in certain embodiments, 3D LIDAR point clouds are overlaid with 2D color images from the same street level perspectives. Based on this matching of 2D and 3D image data, the 3D point cloud data may be colorized to form a 3D colored point cloud image.

In other embodiments, if the 3D point cloud and the 2D color images are collected from different angles and/or positions, additional geometric calculations are necessary to properly align the point cloud image and the 2D color image. In certain embodiments, in order to colorize the 3D point cloud, the 2D color image is a panoramic image, allowing for each point on the 3D point cloud to be matched with its corresponding color pixel. In some embodiments, the panoramic image is a 360 degree panoramic image. As noted above, in some embodiments, at least one individual 2D street level image is captured to form the panoramic image. In one particular embodiment, at least four individual 2D street level images are captured from different angles or perspectives to form the panoramic image. In another particular embodiment, at least six individual 2D street level images are captured from different angles or perspectives to form the panoramic image.

The associations between the pixels of the 2D color image and the point cloud depth values may be stored in a database. In other words, the 3D point cloud and the 2D color images may be pre-aligned and the overlaid or combined data is stored in the database.

In addition to the colorization process, the 3D image data may also be processed prior to or after the colorization process. For example, 3D data points may be acquired in multiple sets through several LIDAR data acquisition sessions, and may need to be assembled into a unified point cloud on a common coordinate system for further processing. Multiple sets of 3D data points may be assembled into a unified point cloud using any registration technique. In an embodiment, a local registration technique is used between two sets of 3D data points. For example, Iterative Closest Point (ICP) techniques may be used to align the rotation and translation differences in the two 3D data point sets. ICP techniques may iteratively revise alignments or transformations to the 3D data point sets such that the distance, or measured difference, between the two 3D data point sets is minimized.

LIDAR point clouds may also undergo point cloud smoothing during processing to minimize or remove 3D data points that do not accurately represent a geographic area, or structures in a geographic area. Any point cloud smoothing technique may be used. In an embodiment, a moving least squares technique is used to minimize a weighted least square error for each 3D data point of the point cloud.

Projecting Colorized 3D Point Clouds onto a 2D Plane

In certain embodiments, the colorized 3D data points are used to create a rasterized aerial image or perspective top-down view of a road scene that is potentially unique in comparison to a conventional aerial or satellite image. In one example, through an overlaying and processing of the captured 2D and 3D street level images and formation of a colorized point cloud having color pixels attributed to the x, y, and z coordinates for the 3D image, a synthesized aerial image may be created, wherein the street level view is shifted or rotated to portray a synthetic aerial image.

The creating of the synthesized 2D aerial image may be done by "rotating" the street level image by using the individual color pixels having x, y, and z coordinates, wherein the z-coordinate may be attributed to the vertical dimension and the x- and y-coordinates attributed to the horizontal, street level plane.

In certain embodiments, the synthetic aerial image will be represented as a "top-down" view, wherein the viewing direction would be 90 degrees or perpendicular/orthogonal to the street level/ground view. In other words, the top-down view may represent a view of the x-y plane from the z-axis. In some embodiments, an "angled" aerial view may be synthesized. In such embodiments, where 90 degrees defines a top-down view and 0 degrees is defined as a street level view, and wherein the synthesized "angled" aerial view may be defined as some degree between 0 and 90. In some embodiments, the angled aerial view is between approximately 45 degrees and 90 degrees. In one particular embodiment, the synthesized angled aerial view is rendered at approximately 45 degrees.

The synthetic aerial image may be rasterized at any particular height above the street level, such as 10 meters, 50 meters, 100 meters, 200 meters, 500 meters, 1000 meters, 1500 meters, etc. For example, where the z coordinate represents the vertical height from the street level, a computer program and its at least one processor may rasterize an image using a determined value for z for the viewing height of the synthetic 2D image.

In certain embodiments, any holes or missing pixels in the rasterized 2D image data may be filled in. In some embodiments, the holes are filled in by analyzing the surrounding pixel colors and calculating the color for the hole or missing pixels through an interpolation process.

Additionally, the rasterized 2D image data may be correlated or matched with its geographic location coordinates. In certain embodiments, the data may be correlated or matched using GPS information from the data collection of the 2D street level images and/or 3D point cloud images.

Figure 3:
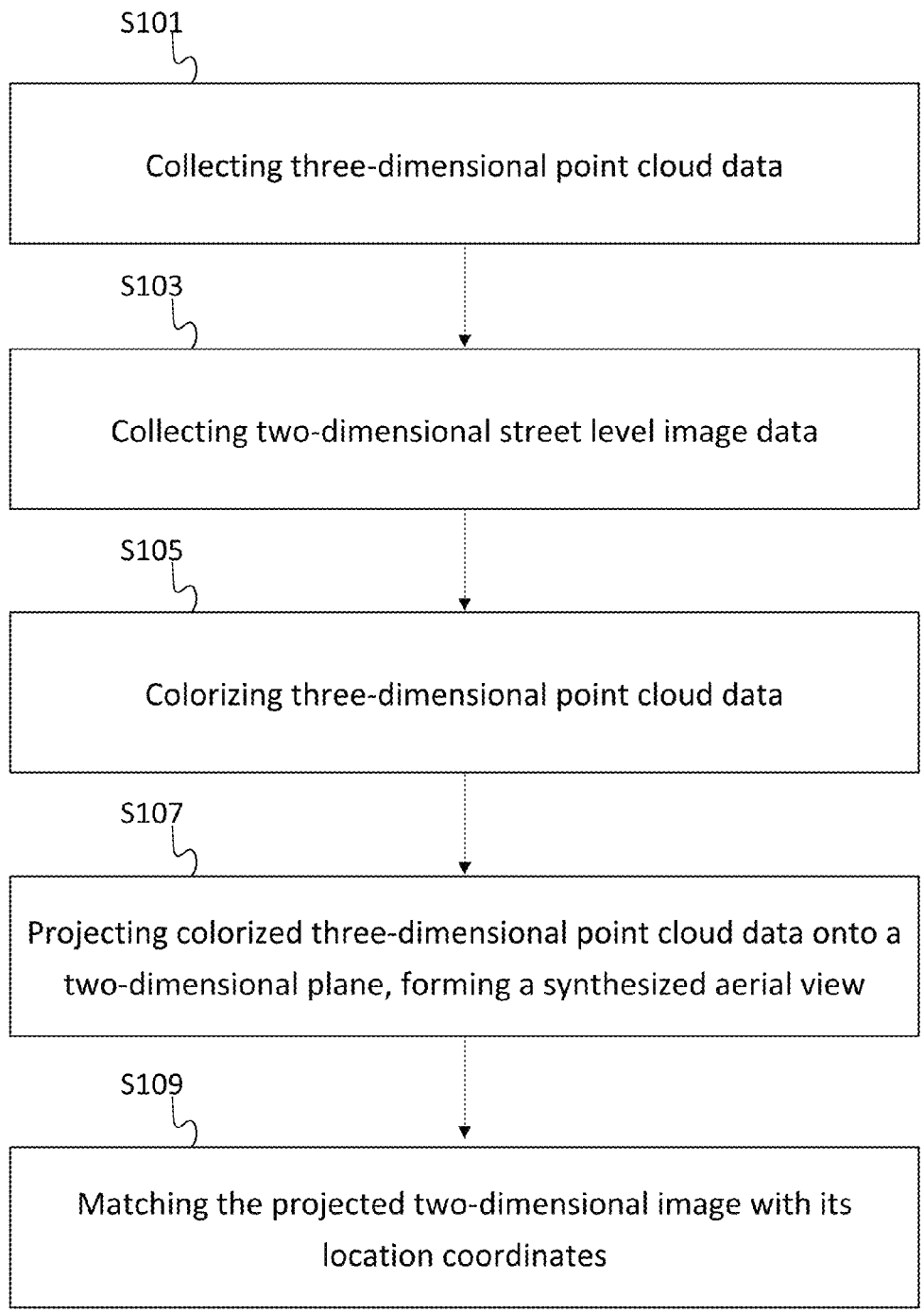
FIG. 3 illustrates an example flowchart for creating a synthetic aerial image from street level imagery.

FIG. 3 illustrates an example flowchart for creating a synthetic aerial image from street level imagery. The process of the flowchart may be performed by the navigation data system 100 or device 201 described and shown in FIGS. 1 and 2. Alternatively, another device may be configured to perform one or more of the following acts. Additional, fewer, or different acts may be included.

At act S101, the navigation data system or device collects 3D point cloud image data. In certain embodiments, the 3D data is acquired using 3D optical distancing systems or intensity-based scanning techniques, such as a LIDAR system, described above. In one embodiment, a LIDAR data acquisition system may be attached or otherwise integrated with a vehicle. There may also be a positioning system integrated with the LIDAR vehicular system such as a GPS to provide a base reference for the data acquired by the LIDAR system. The mobility of a vehicular system may facilitate acquiring data across a large geographic area using established positions for reference and integration of the acquired data into a point cloud representing the geographic area. FIG. 1, discussed above, shows one embodiment of a geographic and/or navigation data system 100 useful for collecting the 3D data points.

At act S103, the system or device collects 2D street level image data. In addition to the collection of the 3D point cloud data, the 2D street level images may also be captured using a street level data collection system, such as, but not limited to, the navigation data system shown in FIGS. 1 and 2, and described above. In certain embodiments, acts S101 and S103 may be performed by the same system or device at a similar time (or approximately the same time).

At act S105, the 3D point cloud data is colorized using the 2D street level image data. The colorization process may involve overlaying a 3D point cloud image with a 2D image of the same scene. That is, in certain embodiments, 3D LIDAR point clouds are overlaid with 2D color images from the same street level perspectives. Based on this matching of 2D and 3D image data, the 3D point cloud data may be colorized to form a 3D colored point cloud image. In other embodiments, if the 3D point cloud and the 2D color images are collected from different angles and/or positions, additional geometric calculations are necessary to properly align the point cloud image and the 2D color image.

At act S107, the colorized 3D point cloud image data is projected onto 2D plane, thereby forming a synthesized aerial view. In certain embodiments, the colorized 3D data points are used to create a rasterized aerial image or perspective top-down view of a road scene. In one example, through an overlaying and processing of the captured 2D and 3D street level images, a synthesized aerial image may be created, wherein the colorized street level view is shifted or rotated to portray a synthetic aerial image At act S109, the synthesized 2D image is matched with is geographic location coordinates. In certain embodiments, the data may be correlated or matched using GPS information from the data collection of the 2D street level images and/or 3D point cloud images.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, and HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and anyone or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a GPS receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

As used in this application, the term "circuitry" or "circuit" refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of "circuitry" applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is therefore intended that the foregoing detailed description be regarded as illustrative rather than limiting, and that it be understood that it is the following claims, including all equivalents, that are intended to define the spirit and scope of this invention.

What is claimed is:

1. A method comprising:
   receiving a three-dimensional point cloud image generated from an optical distancing system at a street level, wherein the three-dimensional point cloud image is processed to minimize or remove data points that do not accurately represent a geographic area;
   receiving at least one two-dimensional street level image generated from at least one camera at street level;
   colorizing the three-dimensional point cloud image with the at least one two-dimensional street level image, thereby forming a colorized three-dimensional point cloud image;
   projecting, using a processor, the colorized three-dimensional point cloud image onto a two-dimensional plane, thereby forming a synthetic aerial image;
   rasterizing the synthetic aerial image at a predetermined height above the street level; and
   calculating a color for at least one hole in the synthetic aerial image.

2. The method of claim 1, further comprising matching the synthetic aerial image with geographic coordinates.

3. The method of claim 2, wherein the matching is performed using global positioning system geographic coordinates collected from the three-dimensional point cloud image or the at least one two-dimensional street level image.

4. The method of claim 1, wherein the optical distancing system is a Light Detection and Ranging system.

5. The method of claim 1, further comprising filling in holes in the colorized three-dimensional point cloud image through an interpolation process.

6. The method of claim 1, wherein the three-dimensional point cloud image and the at least one two-dimensional street level image are collected at a similar time and from a similar geographic location.

7. The method of claim 1, wherein the synthetic aerial image is a top-down aerial image.

8. The method of claim 1, wherein the synthetic aerial image is an angled aerial image.

9. The method of claim 1, wherein the at least one two-dimensional street level image is a 360 degree panoramic image.

10. The method of claim 1, wherein the three-dimensional point cloud image is generated from a plurality of passes by the optical distancing system.

11. The method of claim 1, further comprising:
    rotating the at least one two-dimensional street level image to align with the three-dimensional point cloud image.

12. An apparatus comprising:
    at least one processor; and
    at least one memory including computer program code for one or more programs; the at least one memory and the computer program code configured to, with the at least one processor, cause the apparatus to at least perform:
    receive a three-dimensional point cloud image generated from an optical distancing system at a street level, wherein the three-dimensional point cloud image is processed to minimize or remove data points that do not accurately represent a geographic area;
    receive at least one two-dimensional street level image generated from at least one camera;
    colorize the three-dimensional point cloud image with the at least one two-dimensional street level image to form a colorized three-dimensional point cloud image;
    project the colorized three-dimensional point cloud image onto a two-dimensional plane to form a synthetic aerial image;
    rasterize the synthetic aerial image at a predetermined height above the street level; and
    calculate a color for at least one missing value in the synthetic aerial image.

13. The apparatus of claim 12, wherein the at least one memory and the computer program code are configured to cause the apparatus to further perform:
    match the synthetic aerial image with geographic coordinates.

14. The apparatus of claim 12, wherein the optical distancing system is a Light Detection and Ranging system.

15. The apparatus of claim 12, wherein the at least one memory and the computer program code are configured to cause the apparatus to further perform:
    fill in holes in the colorized three-dimensional point cloud image through an interpolation process.

16. The apparatus of claim 12, wherein the three-dimensional point cloud image and the at least one two-dimensional street level image are collected at a similar time and from a similar geographic location.

17. The apparatus of claim 12, wherein the synthetic aerial image is a top-down aerial image.

18. The apparatus of claim 12, wherein the synthetic aerial image is an angled aerial image.

* * * * *